United States Patent [19]

Golub

[11] Patent Number: 4,520,687
[45] Date of Patent: Jun. 4, 1985

[54] OPERATING MECHANISM FOR A CONTROL DEVICE

[75] Inventor: Gregory J. Golub, Athens, Ga.

[73] Assignee: Westinghouse Electric Corp., Pittsburgh, Pa.

[21] Appl. No.: 470,648

[22] Filed: Feb. 28, 1983

[51] Int. Cl.³ ............................................. G05G 7/00
[52] U.S. Cl. ........................................ 74/491; 74/504; 277/152; 277/188 R; 384/439; 384/440
[58] Field of Search .................. 74/504, 511 A, 511 R, 74/491; 384/152, 439, 130, 153, 271, 272, 276, 440; 251/214; 277/152, 188 R

[56] References Cited

U.S. PATENT DOCUMENTS

| | | | |
|---|---|---|---|
| 2,615,763 | 10/1952 | Wolford | 384/152 |
| 2,740,329 | 4/1956 | Morgenstern | 74/504 X |
| 3,700,248 | 10/1972 | Teske et al. | 384/130 X |
| 4,259,878 | 4/1981 | Anderson | 74/491 |

FOREIGN PATENT DOCUMENTS

| | | | |
|---|---|---|---|
| 220307 | 3/1962 | Fed. Rep. of Germany | 384/153 |
| 586533 | 3/1947 | United Kingdom | 74/504 |
| 913908 | 12/1962 | United Kingdom | 384/153 |

*Primary Examiner*—Allan D. Herrmann
*Attorney, Agent, or Firm*—L. P. Johns

[57] ABSTRACT

An operating mechanism for actuating a control device within a tank housing characterized by a boss extending through an aperture in the tank wall and having a bore, an operating shaft rotatably mounted within the bore and having an external handle and an internal crank portion, link means for connecting the crank portion to the control device, the bore being tapered with one end being larger than the other end, a shaft bearing within the larger end of the bore for supporting the shaft, a seal disposed within the bearing, and retainer means disposed within the bore for retaining the bearing and seal in place.

9 Claims, 5 Drawing Figures

OPERATING MECHANISM FOR A CONTROL DEVICE

BACKGROUND OF THE INVENTION

1. Field of the Invention

This invention relates to an operating mechanism for an electrical inductive apparatus and, more particularly, to a device for use with distribution transformers.

2. Description of the Prior Art

Of the many basic designs that could be used for a mechanism for operating a circuit breaker in a distribution transformer, the design utilizing a boss with holes for operating shafts appears to be the most economical. Previously, a die casting, such as a zinc die cast boss having a hole, required a tapered hole to facilitate die casing. Thereafter a secondary machining operation was required to ream the hole to provide a proper bearing surface. Inasmuch as the reaming operation involved an additional cost, an alternative procedure for a low cost, high quality product was developed.

SUMMARY OF THE INVENTION

In accordance with this invention it has been found that an operating mechanism for extending through an aperture in a housing wall may be provided which comprises a boss extending through the aperture in a tank wall and having a bore, an operating shaft rotatably mounted within the bore and having an external handle portion and an internal crank portion, the bore being tapered as cast with one end being larger than the other end, a shaft bearing within the larger end of the bore, a seal within the bore, and retaining means for retaining the seal and bearing in place.

The advantage of the operating mechanism of this invention is that expensive secondary machining operations are eliminated and means are provided for retaining the seal and bearing in place.

DESCRIPTION OF THE PREFERRED EMBODIMENT

Figure 1:
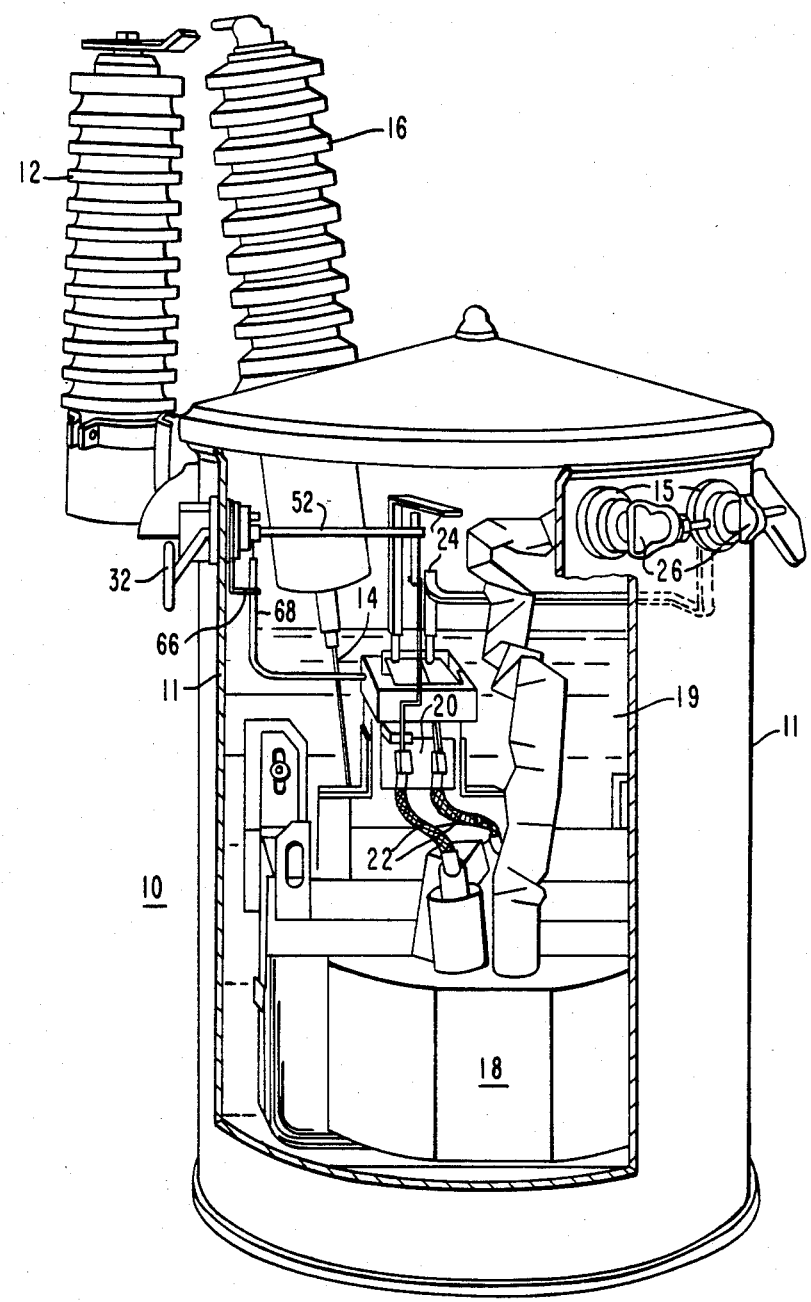
FIG. 1 is a perspective view of an oil-filled distribution transformer.

In FIG. 1 a pole-type completely self-protected distribution transformer is generally indicated at 10 and it comprises an enclosure or tank 11 with a lightning arrestor 12 and a primary high voltage bushing 16 mounted thereon. Seconary bushings, such as low voltage bushing 15, are attached to the enclosure 11 to which the transformer load is connected. A core-coil assembly 18 is secured inside the enclosure 11 with a circuit breaker 20 attached thereto. Primary winding leads 14 extend from the core-coil assembly 18 to the appropriate high voltage bushings 16. The enclosure 11 is partially filled with an insulating liquid dielectric 19, such as transformer oil.

The circuit breaker 20 and the core coil assembly 18 are immersed in the liquid dielectric 19. Secondary leads 22, coming from the core coil assembly 18, connect to input terminals on circuit breaker 20. Conductors 24 connect the output terminals of circuit breaker 20 to the low voltage bushings 15 mounted on the transformer tank 11. Appropriate loads are connected to the low voltage terminals 26 of the distribution transformer 10.

Figure 3:
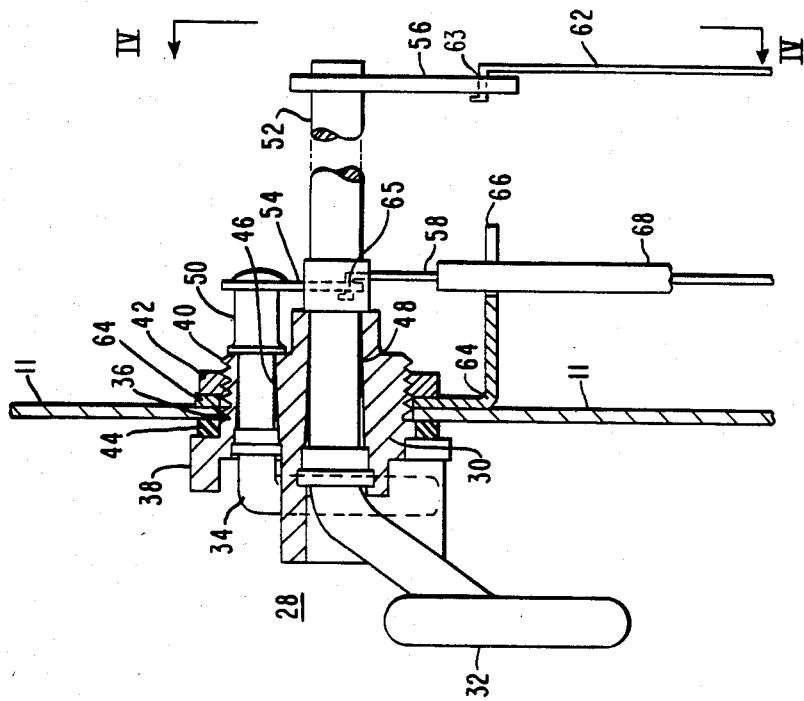
FIG. 3 is a sectional view taken on the line III—III of FIG. 2.
Figure 2:
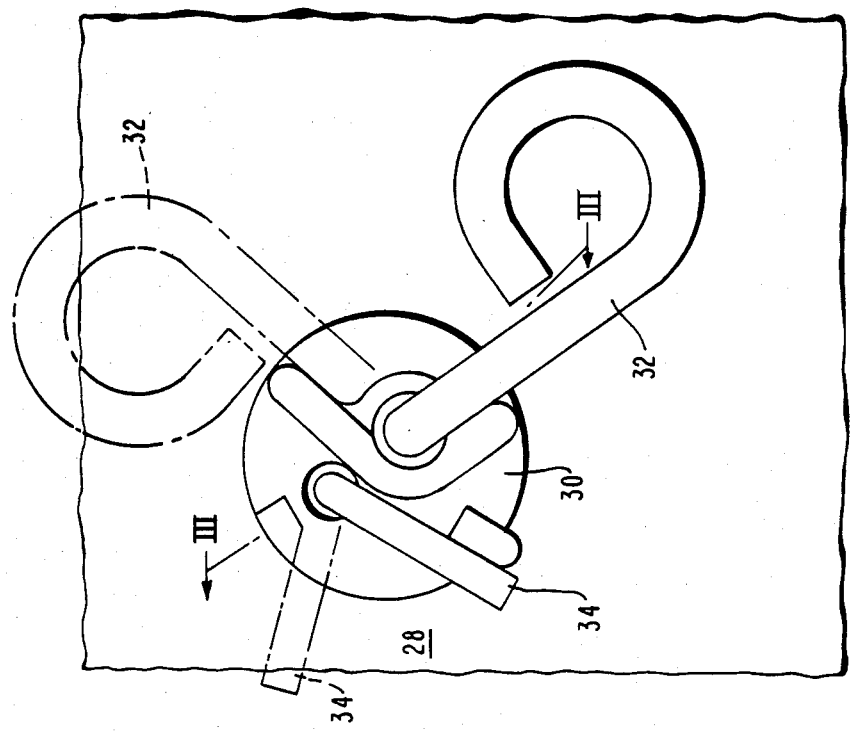
FIG. 2 is an end view of the breaker operating mechanism in accordance with this invention.

A control mechanism, generally indicated at 28 (FIGS. 2, 3), is provided for actuating the circuit breaker 20, such as for varying the power rating and/or emergency opening of a circuit through the transformer. The operating mechanism 28 is disclosed for illustrative purposes as controlling or actuating a circuit breaker for a transformer. However, it is understood that it may be used for controlling other electrical apparatus contained within an enclosed housing wall.

The operating mechanism comprises a boss 30, an external handle or operating arm 32, and an emergency control lever 34. The boss 30 is preferably a zinc die cast member comprising a body extending through an aperture 36 in the wall 11 and having a radial flange 38. A threaded portion 40 of the boss is disposed on the inside of the wall, on the right side, as viewed in FIG. 3, and a retaining nut 42 holds a gasket 44 between the flange 38 and the wall 11. The boss 30 comprises two holes or apertures 46, 48 through which shaft portions 50, 52, respectively, extend.

Arms or crank portions 54, 56 are fixedly mounted on the inner ends of the shaft portions 50, 52, respectively, which portions are cut from steel rod stock, whereby rotation of either shaft portion 50, 52 moves the corresponding crank arm 54, 56. One end of a rod 62 is secured at 63 to the outer end of the crank arm 56 with the opposite end of the rod being secured to a handle or lever (not shown) for opening and closing contacts in the circuit breaker 20 in a conventional manner.

An end of a cable 58 is secured at 65 to the outer end of the crank shaft 54 and the opposite end of the cable is secured to suitable means (not shown) within the transformer for any control purpose, such as changing the power rating thereof.

Figure 4:
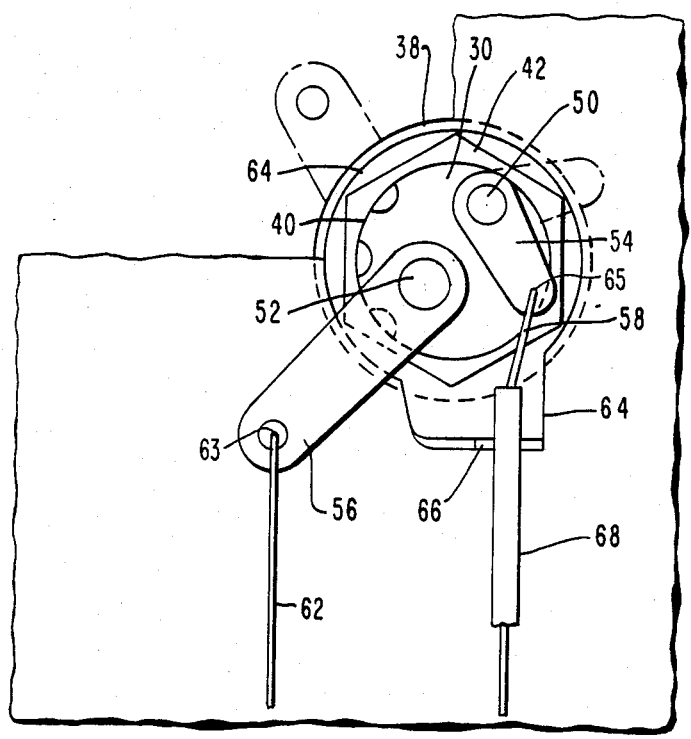
FIG. 4 is an end view taken on the line IV—IV of FIG. 3.
Figure 5:
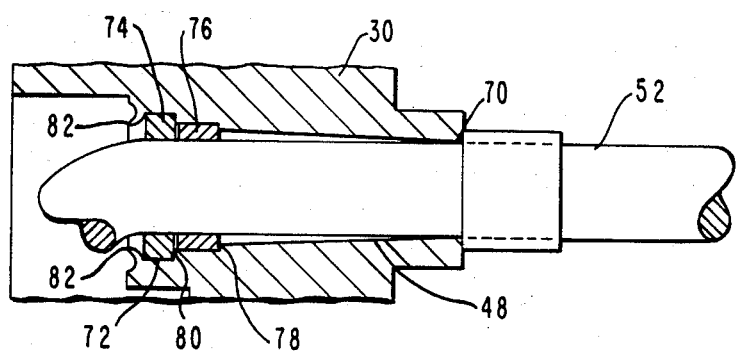
FIG. 5 is a fragmentary enlarged sectional view through the bore of the boss through which the operating shaft extends.

A bracket 64 is mounted fixedly between the inner surface of the tank 11 and the nut 42 and the outer end of the bracket is bifurcated at 66 (FIG. 4) for holding the upper end of a bicycle cable 68 through which the cable 58 extends.

In accordance with this invention the holes or apertures 46, 48 are tapered in accordance with common die casting procedures to provide a draft for separation of the mold and the cast boss. For illustrative purposes, the assembly of the operating shaft 52 in the aperture 48 is shown, it being understood that the shaft 50 in the aperture 46 is identically constructed. The aperture 48 is tapered with the end 70 being smaller than the end 72. The end 70 is tapered to the proper dimension for supporting the operating shaft 52. The larger end 72 of the aperture 48 and being greater than the diameter of the shaft is provided with an annular bearing 74 for mounting the shaft with an annular seal 76 being disposed interiorly of the bearing and adjacent thereto within the outer end 72 of the aperture. In order to provide stable mounting the aperture 48 is die cast at 78 and 80 and the bearing 74 and seal 76 are seated respectively in the seats 78, 80. In addition, the boss is provided with means for retaining the bearings 74 and seal 76 in place. For that purpose a portion of the boss 30 around the end 78 of the aperture 48 is swaged at 82 to provide a barrier for preventing longitudinal movement of the bearing and seal out of place.

Other retaining means than the swage 82 may be used.

The seal is preferably comprised of Nytrile rubber and may be in the form of an O-ring. The bearing 74 is comprised of any bearing material and is preferably comprised of nylon. It may be comprised of a metal, such as aluminum or bronze, and must be able to withstand ambient destructive atmospheres which is why nylon is preferred.

In conclusion, the operating mechanism of this invention is the result of a cost saving procedure whereby a die cast boss having longitudinal apertures which are tapered for draft for separating the die cast mold from the molded boss. To avoid the costly procedure of reaming the entire length of the tapered hole to provide a cylindrical aperture, the larger end of the tapered aperture is provided with a bearing for mounting the operating shaft therein.

What we claim is:

1. An operating mechanism for extending through an aperture in a housing wall, comprising:
    a boss extending through the aperture in the wall and having a bore;
    an operating shaft rotatably mounted within the bore;
    the bore being tapered with one end being larger than the other end;
    a shaft bearing within said one end; and
    the shaft being supported solely by the boss at said other end.

2. The mechanism of claim 1 in which said one end has a first counterbore and a seal seated within the counterbore.

3. The mechanism of claim 1 in which said one end has a second counterbore in which the bearing is seated.

4. The mechanism of claim 2 in which the boss comprises retainer means extending into the bore for retaining the seal and bearing in place.

5. The mechanism of claim 4 in which the seal is disposed interiorly of within the bearing which is within the retainer means.

6. An operating mechanism for actuating a control device within a tank wall, comprising:
    a boss extending through an aperture in the tank wall and having a bore;
    an operating shaft rotatably mounted within the bore and having an external handle and an internal crank portion;
    link means for connecting the crank portion to the control device;
    the bore being tapered with one end being larger than the other end;
    a shaft bearing within said one end; and
    the shaft being supported at said other end solely by the boss.

7. The mechanism of claim 6 in which a seal is disposed adjacent to the bearing.

8. The mechanism of claim 7 in which retainer means are disposed within the bore for retaining the bearing in place.

9. The mechanism of claim 6 in which the retainer means comprises a swaged portion of the wall extending into the bore.

* * * * *